May 2, 1939.  O. H. BASQUIN  2,156,715
CONTACT STRIP
Filed Aug. 12, 1937
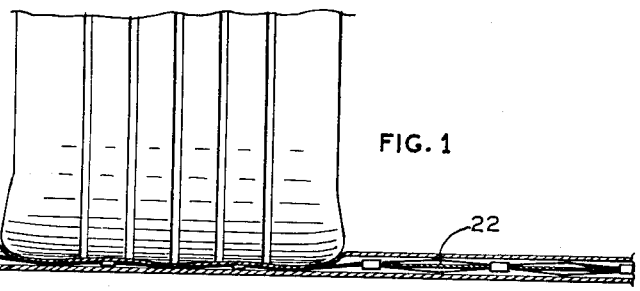
FIG. 1
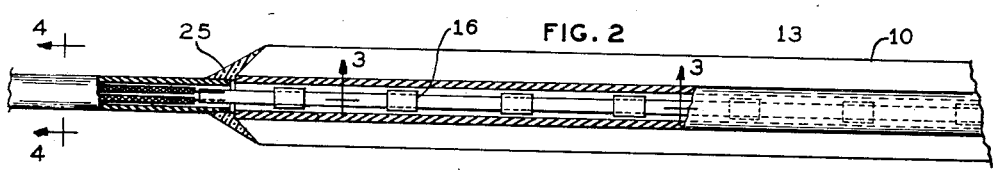
FIG. 2
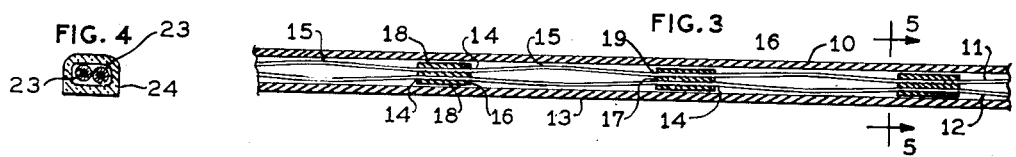
FIG. 3
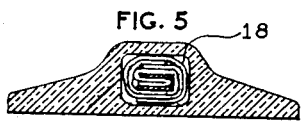
FIG. 4
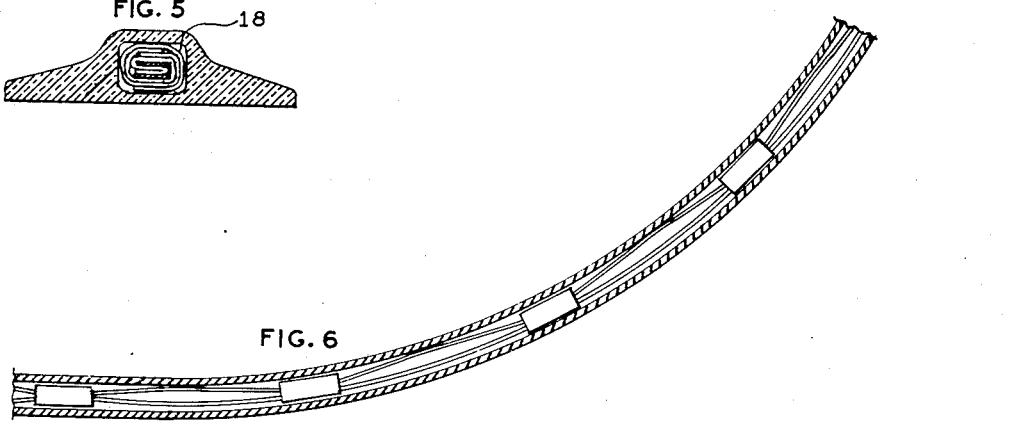
FIG. 5
FIG. 6
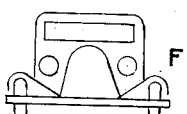
FIG. 7
INVENTOR
OLIN H. BASQUIN
BY Roland C. Rehm
ATTORNEY Patented May 2, 1939

2,156,715

UNITED STATES PATENT OFFICE 2,156,715

CONTACT STRIP

Olin H. Basquin, Evanston, Ill., assignor to Streeter-Amet Company, Chicago, Ill., a corporation of Illinois Application August 12, 1937, Serial No. 158,783

4 Claims. (Cl. 200—86)

This invention relates to electric contact strips, such as road strips, and among other objects, aims to provide an improved strip capable of standing severe service conditions.

The nature of the invention may be readily understood by reference to one construction embodying the invention shown in the accompanying drawing.

In said drawing:

Fig. 1 is a longitudinal section of a road strip, a portion of which is shown depressed by the action of a vehicle tire;

Fig. 2 is a plan view of the road strip, certain parts being shown in section;

Fig. 3 is a longitudinal section of the road strip on an enlarged scale;

Fig. 4 is a section taken on the plane 4—4 of Fig. 2;

Fig. 5 is a section taken on the plane 5—5 of Fig. 3;

Fig. 6 is a longitudinal section of a portion of the strip curved or bent in a coil, to illustrate the compensating action of the contact strips; and Fig. 7 is a diagrammatic view showing the relation of dead and live sections of the strip to the tread gauge of a vehicle.

The invention is here shown embodied in an elongated road strip 10 adapted to be laid across a road or other pavement where it will be operated by vehicle tires passing over it. Strips of this character may advantageously be used for example in making traffic surveys, in which case they are located at strategic points across highways. The strip is, of course, placed in circuit with electric traffic counting apparatus of an appropriate character, such, for example, as that disclosed in Paver Patent No. 2,067,336. In service of this sort, the strip is frequently taken up and shifted to other locations and is required to withstand the severe stress which this usage involves without developing a short circuit.

As here shown, the strip assembly comprises a pair of superposed metallic conductor strips 11 and 12 normally electrically insulated from each other and surrounded by a protective casing 13 which may advantageously be rubber. The metallic strips are adapted to be brought momentarily into electric contact by the pressure of a vehicle wheel (see Fig. 1). The strips should preferably be of tempered or spring material, such as Swedish blue steel, to resist permanent deformation under the blow delivered thereto by vehicle wheels. While the lower metallic conductor strip is not subjected to the severe usage imposed on the upper strip, particularly if the roadway be flat and smooth, it is nevertheless advantageously made of similar material to adapt the strip for use on a rough or unpaved road where both conductor strips are subject to bending and should therefore be able to resist permanent deformation.

Strip assemblies of this sort may be from twenty to one hundred feet in length (depending upon the width of the roadway), and can be conveniently transported from place to place only by coiling the same in a coil of convenient diameter. Since the contact strips are spaced from each other, they assume, when bent in a coil, arcs of different radii and therefore of a different circumferential length. Without the improvements presently described, this would create a longitudinal thrust in the inner (or shorter) curved strip which would cause the strip to buckle severely, since it would be unable, because of frictional resistance, to shift or slip longitudinally of the other strip. The buckle often would be so severe as either permanently to distort the strip (and thereby cause a short circuit) or to break the strip. In this connection it would be immaterial whether or not the metal strips were bound together against longitudinal shifting, since the frictional resistance offered both by the covering over the strips and by the strips themselves when coiled would alone be so great as to prevent longitudinal relative slipping to relieve the aforesaid longitudinal thrust.

In the present strip assembly, the metallic contact strips 11 and 12 are advantageously given what may be called a "sinusoidal" or wavy contour to avoid the aforesaid damage when the strip assembly is coiled. While the waves or corrugations in the strips are quite shallow, they are sufficient to prevent severe buckling or the concentration of the buckling in one point when the assembly is coiled. As shown in Fig. 6, on bending the strip, the corrugations in the outer strip slightly flatten while those in the inner strip slightly increase in height. There is no pronounced bending of the inner strip at one point but some compensation occurs at each corrugation.

In the present instance it is possible to give the metallic conductor strips their "sinusoidal" conformation in their tempered condition simply by passing the strips through corrugating rolls which bend them sufficiently at spaced points to leave a residual corrugated contour. In the present instance, the valleys 14 of the corrugations are spaced about two inches; about one and three-quarter inches to be exact. This spacing has been found to be advantageous for Swedish blue steel strips five-sixteenth inch in width and .018 inch in thickness, but it should be understood that this spacing is not essential and for strips having different characteristics or dimensions would doubtless be changed accordingly. Preferably the corrugations in each strip are equally spaced, and when assembled, the valleys of the corrugations of each strip are located in register, thereby to bring the crests 15 of the corrugations in opposing register and cooperating to maintain the strips in separated condition. For convenience, the expression "valleys" has been used to designate those portions of the strips in closest proximity and "crests" has been used to designate those portions having the greatest separation.

At the valleys of each of the corrugations, the strips are electrically insulated. In this instance, the insulation 16 is about one-half inch in length, longitudinally of the strip, and is anchored thereto to prevent longitudinal relative slipping or creeping of the strips which might carry the valleys of the corrugations out of register and possibly cause a short circuit.

Corrugating both strips minimizes the tendency of one strip to creep longitudinally of the other under action of passing vehicles, since both strips elongate equally when flattened by the passage of a vehicle. The road strip assembly may be coiled, however (without damage), if only one contact strip be corrugated since the corrugations permit the strip either to lengthen or be shortened to effect the necessary compensation.

The insulating connection is provided, in this instance, by an adhesive which adheres well to metal. An appropriate material is a tough paper tape known on the market as Scotch tape. It carries an adhesive compound (of which rubber is one constituent) which adheres firmly to metal, even at the relatively high temperatures encountered in service. The tape is one-half inch in width, and is folded (with the adhesive faced outward) so as to provide a double thickness 17 between the strips adhering to both strips. It is then wrapped completely around both strips so as to bind them firmly together. Preferably the external surface of the connection is finished so as to provide a smooth surface having relatively low frictional resistance, thereby facilitating threading the strip through the rubber covering. A low friction finish of this character may be provided by a gummed cloth tape 18 having a smooth or highly finished surface which is wrapped one or more times around the Scotch tape. Preferably, one or more coats of lacquer are applied to the outer surface of the aforesaid cloth tape and also to the exposed edges of the tapes, to provide a smooth and slippery surface which minimizes frictional resistance to pulling of the assembled metallic contact strips through the rubber covering 13.

In the present instance, the contour of the metallic strips 11 and 12 is not exactly "sinusoidal". The valleys in the strip are shown with somewhat more abrupt curvature than would be possible if the contour were "sinusoidal". The strips thus diverge from the insulated regions more abruptly than would be the case if the contour were "sinusoidal" and thereby increase the space 19 between the strips at the point where they emerge from the insulation. While the curve at the crests of the corrugations need not be thus abrupt, it is desirable for practical reasons that it be similar to that at the valleys.

The protective covering 13 may advantageously be similar to that disclosed in said Paver patent or in the co-pending Paver application, Serial No. 114,597. The covering is relatively wide, not only to provide an adequate base by which the strip assembly may be attached to the roadway, but to permit a relatively gradual taper to the upper surface which minimizes the impact delivered to the strip by rapidly moving vehicle wheels.

The strip may advantageously be attached to the roadway by an appropriate form of plastic cement which maintains its adhesive character throughout the range of temperatures encountered in service. While the cement bond is great enough to hold the strip in place, it does not prevent its removal intact when it has served its purpose in the given location. The strip is thus adapted to be moved from place to place, and, as stated above, it may be coiled without danger of developing a short circuit or breaking one of the metallic contact strips.

The strip may advantageously be provided with live and dead sections 20 and 21, respectively, as disclosed in said Paver application. The lengths of the live sections 20 are each slightly in excess of the vehicle tread gauge (a length of about sixty inches being satisfactory) and the length of the dead sections 21 should be less than the vehicle tread gauge (a length of about fifty inches being satisfactory). The use of dead or inactive sections has a number of advantages such that a double count is not made if a vehicle passes across the strip in a diagonal direction, and the possibility of short circuiting is proportionally lessened. In the present instance, the dead sections are rendered inactive simply by including between the metallic contact strips a strip of insulation 22 (see Fig. 1) which extends between the strips throughout the length of the dead section. Obviously, however, the dead section may comprise instead any ordinary insulated conductors.

As here shown, the metallic contact strips project from the covering 13 where they are connected to lead wires 23 (see Figs. 2 and 4). The lead wires are also preferably protected by waterproofed covering 24, such as rubber, which is advantageously vulcanized or otherwise sealed to the end of the covering 13, as at 25 (Fig. 2) to prevent the entrance of moisture into the covering 13. At the opposite or free end of the contact strip, the covering 13 is preferably tightly sealed to exclude moisture.

Obviously, the invention is not limited to the details of the illustrative construction, since these may be variously modified. Moreover, it is not indispensable that all features of the invention be used conjointly, since various features may be used to advantage in different combinations and subcombinations.

Having described my invention, I claim:

1. A portable contact strip assembly for roads and the like comprising in combination a pair of elongated metal contact strips each having an undulating contour and arranged with the valleys of the undulations in register with those of the other strip, insulating means at the points of registration for holding the strips out of electrical contact, and a protective covering over said assembly, said strips deflecting at a plurality of points upon bending or coiling said assembly to prevent buckling or breaking of a strip.

2. A contact strip assembly of the character described comprising in combination a pair of elongated metal contact strips, one of said strips having an undulating form comprising crests and valleys, means including insulation at each of said valleys for connecting said strips together with their flat faces opposite and so spaced that on deflection the crest portions may make electrical contact with the other strip and for holding said strips electrically separated when not deflected, said strips having substantially greater separation at said crests than at said valleys, the undulations in said strips being adapted to deflect when said assembly is curved or coiled to prevent permanent distortion or breakage of said strips.

3. A portable coiled contact strip assembly for roads and the like comprising in combination a pair of superposed metal contact strips, each having an undulating contour and arranged with the valleys of the undulations in register with those of the other strip, said strips being electrically insulated from each other at said valleys but the crests of the undulations being capable upon deflection of electrical contact, and means for connecting said strip against relative longitudinal displacement, the undulations in the respective strips in coiled condition being respectively flatter and deeper than when in uncoiled condition to prevent severe buckling of a strip in coiled condition.

4. A contact strip of the character described comprising in combination a pair of opposite elongated spring metal strips each having relatively flat transverse corrugations, the valleys of the corrugations in one strip being in register with valleys in the opposite strip, and insulating means at said points of register for connecting said strips against substantial relative longitudinal movement.

OLIN H. BASQUIN.